United States Patent Office 3,392,351
Patented July 9, 1968

3,392,351
GASEOUS LASER EMPLOYING AN ACTIVE
VAPOR IN EQUILIBRIUM WITH A LIQUID
COOLANT
Ping K. Tien, Chatham Township, Morris County, N.J.,
assignor to Bell Telephone Laboratories, Incorporated,
New York, N.Y., a corporation of New York
Filed Nov. 20, 1964, Ser. No. 412,757
6 Claims. (Cl. 331—94.5)

ABSTRACT OF THE DISCLOSURE

In the disclosed apparatus, there is provided a reservoir of cryogenic liquid, the vapor of which serves as the active gas of the laser. The envelope of the laser has two openings to the vapor to promote circulation of the vapor therethrough by convection to cool the active gas of the laser.

Figure 1:
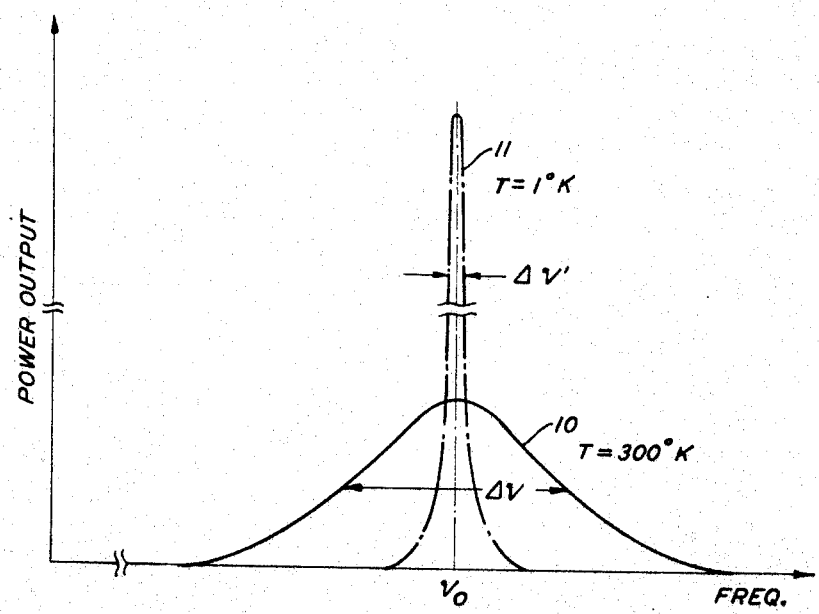

This invention relates to gaseous lasers and more specifically to gaseous lasers having extremely narow bandwidth-gain characteristics.

In recent years lasers, or optical masers, as they are often called, have become a favorite of researchers in communication and countless other fields. The term laser is commonly used with reference to devices which, by stimulated fluorescent emission, produce radiation in the infrared, visible, and ultraviolet portions of the electromagnetic spectrum, referred to collectively as the optical range. Devices of this type are capable of producing radiation which is highly directional, coherent and monochromatic.

The term "monochromatic," of course, refers to the narrow bandwidth of the gain characteristic of the laser. By comparison with other devices capable of generating electromagnetic radiation, the laser possesses a very narrow bandwidth. This is only by comparison, however, and in fact presently known gaseous lasers generally have a gain versus bandwidth curve several hundred megacycles wide at the half-power points.

The advantages to be achieved by making the bandwidth of a laser even narrower are numerous. Specifically, a narrower bandwith results in a greater frequency stability, a reduction in the generation of multiple wave modes, and an increased gain within such narrowed bandwidth. Increased gain, in turn, permits higher efficiency of operation. For example, if the laser is used as an amplifier, the increased gain results in a higher amplification ratio and, on the other hand, if the laser is used as a generator, the increased gain results in a lower threshold level of pumping power and a higher output level for a given length of interaction region.

It is a general object of the present invention to reduce the bandwidth of a gaseous laser, thereby to improve its monochromaticity.

It is another object of the present invention to increase the gain of a gaseous laser.

Several factors contribute to the broadening of the atomic transition of the active medium of a gaseous laser and, therefore, to the broadening of the frequency bandwidth of the laser gain curve. One major factor is Doppler broadening, which is due to the thermal motion of the atoms of the active laser medium. The amount of Doppler broadening is proportional to the frequency of the above-mentioned atomic transition and therefore, at low frequencies, may be insignificant. However, at frequencies corresponding to wavelengths shorter than about 2 or 3 microns, the Doppler-broadening factor contributes substantially to the total broadening of the bandwith of the laser gain characteristic.

In accordance with the teachings of the present invention, the active gaseous medium filling the laser is cooled to cryogenic temperatures. By so doing the thermal motion of the gas atoms is decreased, thereby decreasing the effect of Doppler broadening. Since the product of the gain and bandwidth of a laser is constant under otherwise identical operating conditions, the gain of the laser is increased by the same factor. It can be appreciated that any cooling of the active medium results in some reduction in the Doppler broadening factor. However, the present invention has special application when the active gas is cooled substantially to cryogenic temperatures. As used therein, cryogenic temperatures correspond to temperatures at which media normally gaseous at room temperature are liquids.

In accordance with the present invention there is provided a reservoir of cryogenic liquid, the vapor of which serves as the active medium of the laser.

A preferred embodiment of this invention utilizes a laser cavity disposed within a Dewar flask partially filled with liquid helium. The envelope of the laser cavity is open to the vapor existing inside the Dewar flask in equilibrium with the liquid helium. The liquid helium thereby serves the dual function of coolant and source of the gas atoms constituting the active medium of the laser.

Figure 2:
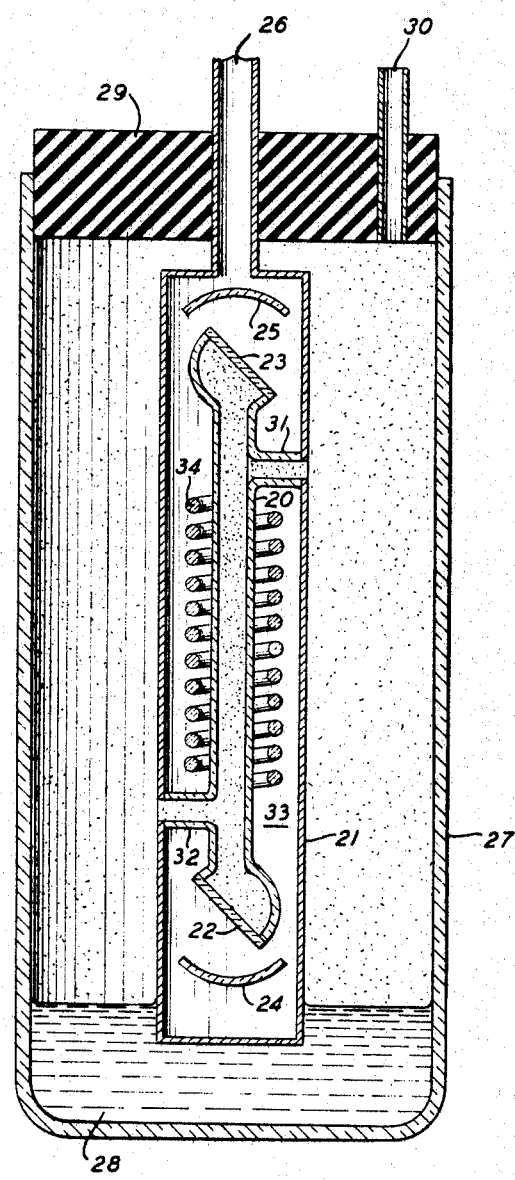

The foregoing and other objects and features of the present invention may be more fully understood from the following detailed description considered in conjunction with the attached drawings, in which:

FIG. 1 is a graphical representation of the gain versus frequency curves of a typical gaseous laser operating at room temperature and at a cryogenic temperature; and FIG. 2 is a cross-sectional view of a preferred embodiment of the present invention.

Referring more specifically to the drawings, FIG. 1 is a graphical illustration of the gain versus bandwidth characteristics of a typical gaseous laser. In FIG. 1, curve 10 represents the Doppler-broadened gain characteristic of the laser operating at room temperature. It is recognized that the frequency scale of FIG. 1 has been expanded a great deal in order to emphasize the shape of the curves. Curve 10 is, ideally, a Gaussian curve with its maximum at a center frequency $\nu_0$ corresponding to the most probable atomic transition of the active gaseous medium of the laser. The bandwidth of the laser gain curve, $\Delta \nu$, is conventionally measured at the half-power points.

As mentioned hereinabove, one of the primary factors contributing to the bandwidth of the gain curve is the Doppler-broadening effect. The effect of the Doppler broadening can be seen by considering a typical laser utilizing helium gas as the active medium. For example, the $3^3D \rightarrow 4^3P$ transition of helium produces radiation at 1.955 microns which correspond to a center frequency $\nu_0$ of approximately $1.5 \times 10^8$ megacycles per second. The Doppler width, $\Delta \nu$, of the gain curve of the laser can be calculated from the formula:

$$\Delta \nu = \frac{2\nu_0}{c}\left(\frac{2kT}{m}\ln 2\right)^{1/2} \quad (1)$$

where $c$ is the velocity of light in free space, $k$ is Boltzmann's constant, T is the average atomic temperature of the helium and $m$ is the atomic mass of helium. If T is equal to 300° Kelvin (room temperature) it is found that the Doppler-broadened bandwidth is approximately 1110 megacycles per second. By decreasing the average atomic temperature T of the helium to 1° Kelvin the Doppler bandwidth of the laser is reduced by a factor $\sqrt{300/1}$, or approximately 17.3. The gain characteristic resulting from decreasing the temperature of the active medium is shown graphically by curve 11 in FIG. 1. For the sake of clarity, the height of curve 11 has been foreshortened.

It is obvious from Equation 1 that the bandwidth of the laser gain curve decreases as the square root of average atomic temperature of the active gaseous medium. The greatest improvement in bandwidth, therefore, occurs at temperatures within a few degrees of absolute zero. It is apparent, however, that even an operating temperature slightly below room temperature will result in a reduction in the bandwidth.

It is well known that the gain per unit length of a laser is determined by the expression:

$$\text{gain} = \frac{g_2 A \lambda_0^2}{4\pi \Delta \nu} \left(\frac{\ln 2}{\pi}\right)^{1/2} \left(\frac{N_2}{g_2} - \frac{N_1}{g_1}\right) \qquad (2)$$

(See: "Gaseous Optical Masers" by W. R. Bennett, Jr. appearing in Applied Optics, 1962 Supplement on Optical Masers, pp. 24–60 at p. 28.) In Equation 2 the constants $N_2$ and $N_1$ are the population densities of the atoms in the upper and lower states, respectively; $g_2$ and $g_1$ are the corresponding statistical weights for these states; and $A$ is the individual Einstein A-coefficient for the transition. By multiplying both sides of Equation 2 by the Doppler bandwidth $\Delta \nu$, it is seen that the gain-bandwidth product is constant under conditions where $N_1$, $N_2$, $g_1$ and $g_2$ remain unchanged. As a practical matter $g_1$ and $g_2$, being physical constants of the active gaseous medium, remain constant regardless of the operating temperature. The population densities $N_1$ and $N_2$, on the other hand, are primarily functions of the pumping or excitation power and remain substantially unchanged provided the pumping power of the laser is constant. Thus, it is seen that by reducing the Doppler bandwidth of the laser, its gain is increased proportionately.

An illustrative embodiment of a gaseous laser capable of operating at cryogenic temperatures is shown in the cross-sectional view of FIG. 2. In FIG. 2 a glass tube or envelope 20 is coaxially disposed within a cylindrical conductive shield 21. A pair of transparent windows 22 and 23 are sealed to either end of envelope 20 in a manner well known in the art. Windows 22 and 23 are preferably inclined to the axis of envelope 20 at the Brewster angle. A substantially totally reflecting concave reflecting surface 24 and a partially transmissive concave reflecting surface 25 combine to form the laser cavity. Energy is extracted from the laser cavity through partially transmissive reflecting surface 25 by means of a light-conductive output channel 26 through one end of conductive shield 21. Of course, it will be appreciated by those skilled in the art that if the laser is used as an amplifier the cavity can be omitted.

Envelope 20 and shield 21 are disposed within a Dewar flask 27 which, in turn, is partially filled with a cryogenic liquid medium 28. For purposes of illustration, the present embodiment will be described as utilizing superfluid helium as the liquid medium. Helium was chosen primarily because of its well-known ability to remain a liquid at temperatures less than 1° Kelvin, which temperature is well within the cryogenic range. Dewar flask 27 is closed off by suitable means such as a stopper 29 through which a first aperture is provided for output channel 26.

In equilibrium with the superfluid helium is a helium vapor which fills the remainder of Dewar flask 27. A second aperture is provided through stopper 29 for the passage of a small tube 30. Tube 30 is connected to suitable pumping means, not shown, for maintaining the helium vapor at the desired pressure. In particular, it is known that a helium laser can be operated at a pressure of 0.3 mm. Hg which corresponds to a temperature of approximately 1.10° Kelvin. Since the temperature of a liquified gas and its vapor pressure are related, the pumping means connected to tube 30 also affords a means of controlling the operating temperature. A complete table of the temperature-pressure correspondence of helium vapor can be found for example, in "Experimental Techniques in Low-Temperature Physics," by G. K. White, Oxford, Clarendon Press, 1959, pp. 104–5. The helium vapor is allowed to circulate through envelope 20 by means of connecting tubes 31 and 32 which communicate with envelope 20 and extend through conductive shield 21. Connecting tubes 31 and 32 are bonded to envelope 20 and shield 21 in a manner well known in the art to prevent any vapor leakage into the interior of shield 21. Preferably the region 33 inside shield 21 surrounding envelope 20 is partially evacuated so as to minimize the pressure differential between the inside and outside surfaces of shield 21. The evacuation of region 33 may be conveniently accomplished, for example, by a vacuum pump attached to output channel 26 by means of a T fitting.

In operation, a high frequency pumping source, not shown, supplies R-F energy to a helical exciting coil 34 surrounding envelope 20 inside shield 21. Laser action is initiated when the pumping power produces a population inversion in the energy level system of the helium vapor in the manner well known in the art. Although the illustrative embodiment of FIG. 2 utilizes a form of R-F pumping, it is understood that this is for purposes of illustration only. A D-C discharge or other pumping means well known in the art can be utilized to produce the desired population inversion.

As mentioned above, the helium vapor circulates freely through envelope 20. Thus, the vapor within the envelope, which can become contaminated, is replenished by clean vapor provided by liquid medium 28. This feature also facilitates cooling, since the cool vapor comprising the active medium is introduced into the laser envelope by convection. In this manner reliance is not placed solely on conduction and radiation cooling.

While the illustrative embodiment of FIG. 2 is described in terms of an active medium consisting of helium vapor, it is obvious that other active media can be utilized. For example, other noble gases such as neon, argon or krypton can be utilized. It must be emphasized, however, that whereas helium can be cooled to below 1° Kelvin without losing its gaseous properties, other known gases cannot. From Equation 1 it is thus apparent that the degree of bandwidth reduction obtainable with other active media will be less.

In all cases, it is understood that the above-described arrangement is merely illustrative of one of the many embodiments which can represent applications of the principles of the present invention. Numerous and varied other arrangements including those utilizing other active media and other cooling schemes can be readily devised by those skilled in the art without departing from the spirit and scope of this invention.

What is claimed is:

1. A laser for producing coherent radiation comprising, in combination, a nonporous vessel, a liquid medium partially filling said vessel, a vapor of said liquid medium in equilibrium therewith, an envelope suitable for confining the stimulated emission of said coherent radiation disposed within said vessel, said envelope having two openings to said vapor to promote circulation of said vapor therethrough by convection, said vapor being capable of producing coherent radiation by stimulated emission, means for applying pump wave energy to said vapor within said envelope for producing a population inversion therein, and means for extracting said coherent radiation from said envelope.

2. The laser according to claim 1 including further means for regulating the temperature of said vapor.

3. A laser for producing coherent radiation comprising, in combination, a nonporous vessel, a liquid medium comprising helium in its superfluid state partially filling said vessel, helium vapor of said liquid medium in equilibrium therewith, a resonant structure for said coherent radiation disposed within said vessel, said resonant structure being open to the circulation of said vapor, said vapor being capable of producing coherent radiation by stimulated emission, means for applying pump wave energy to said vapor within said resonant structure for producing a population inversion therein, and means for extracting said coherent radiation from said resonant structure.

4. A laser for producing coherent radiation comprising, in combination, a cryogenic member, a conductive shield disposed within said cryogenic member, a glass envelope disposed within said conductive shield, a pair of reflecting surfaces oppositely disposed adjacent said envelope, at least one of said reflecting surfaces being partially transparent to said coherent radiation, said reflecting surfaces combining to form a resonant structure for said coherent radiation, a liquid medium partially filling said cryogenic member, a vapor of said liquid medium in equilibrium therewith, said envelope being open to the circulation of said vapor, said vapor being capable of producing coherent radiation by stimulated emission, means for applying pump wave energy to said vapor within said envelope for producing a population inversion therein, and means for extracting said coherent radiation from said resonant structure.

5. The laser according to claim 4 including further means for regulating the temperature of said vapor.

6. The laser according to claim 4 wherein said liquid medium is helium in its superfluid state and said vapor is helium vapor.

References Cited

UNITED STATES PATENTS

| 3,130,254 | 4/1964 | Sorokin et al. | 331—94.5 |
| 3,208,009 | 9/1965 | Etzel et al. | 331—94.5 |
| 3,339,150 | 8/1967 | Bownese | 331—94.5 |

FOREIGN PATENTS

| 608,711 | 3/1962 | Belgium. |
| 1,246,604 | 10/1960 | France. |

OTHER REFERENCES

Wolff, Electronics, vol. 35, #33, pp. 28–29, August 1962.

JEWELL H. PEDERSEN, *Primary Examiner.*

B. J. LACOMIS, *Assistant Examiner.*